United States Patent Office 3,258,497
Patented June 28, 1966

3,258,497
HYDROXYMETHYL-2-METHYLOCTA-2,7-DIENES
Seymour Lemberg, Elizabeth, N.J., assignor to International Flavors & Fragrances Inc., New York, N.Y., a corporation of New York
Filed July 17, 1961, Ser. No. 124,446
3 Claims. (Cl. 260—632)

This invention relates to new acyclic primary alcohols and processes for making same from cis and trans-myrtanol.

The cis and trans-myrtanol may be prepared from β-pinene by hydroboration followed by oxidation, in accordance with J. C. Braun and G. S. Fisher, Tetrahedron Letters, No. 21, pp. 9–11, 1960, and references therein. An alternate synthesis via aluminum alkyl exchange with β-pinene also provides a convenient method of preparation, following the general procedure in the following authors: K. Ziegler, F. Krupp and K. Zosel in Annalen der Chemie, vol. 629, pp. 241–250, of 1960.

The principal object of the invention is to produce primary acyclic alcohols of the type described, and to provide a simple, efficient process for their manufacture.

I have found in accordance with my invention that such alcohols may be produced by pyrolytic isomerization of cis and trans-myrtanols, and that such alcohols are valuable perfume materials.

The invention comprises the novel products as well as the novel processes and steps of processes according to which such products are manufactured, the specific embodiments of which are described hereinafter by way of example and in accordance with which I now prefer to practice the invention.

I have found that myrtanol, either as the cis or trans-isomer, when heated to pyrolysis temperatures in the vapor-phase yields a mixture of the following: (1) [6-methyl-2-vinyl 5-heptene-1-ol] and (2) [2-(2-methyl propenyl) - 5 - hexene - 1 - ol], and (3) unreacted myrtanol, formed in accordance with the following reactions:

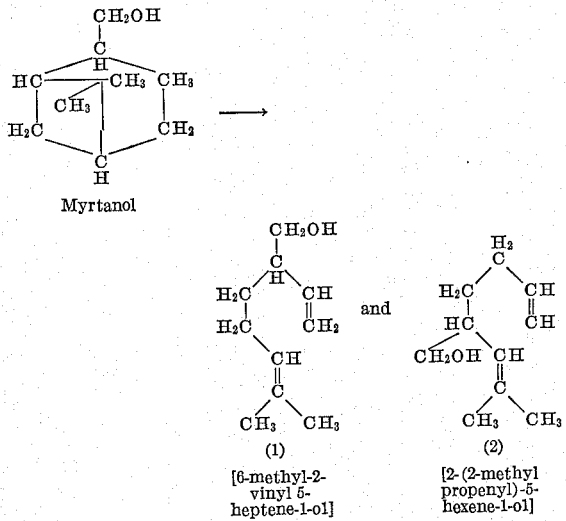

The alcohols formed, (1) and (2), possess a degree of optical activity which is dependent upon the optical activity of the myrtanol used. In general I have found it important to conduct the isomerization in the vapor-phase, the temperature ranging from at least 450 to 825° C., under reduced pressure, preferably 20 mm. Hg. I have found, furthermore, that the pyrolysate may be separated into its constituents by vacuum fractional distillation.

The following are examples of the manner in which I now prefer to carry out my invention for the production of the products mentioned. It is to be understood that the invention is not to be considered as limited thereto except as indicated in the appended claims:

*Example 1.*—400 grams of cis-myrtanol, boiling point 80° C./0.5 mm. Hg, $n_D^{20}$ 1.4887, $D_4^{25}$ 0.970, $[\alpha]^{23}D$ —17.01° C.; pertinent infrared bands, $$v_{max.}^{liq.}\ 1015\ cm.^{-1}$$

1047 cm.$^{-1}$ (C-O stretch) were pyrolyzed in a 27" stainless steel tube, type 310, ¼" O.D., at 20 mm. Hg at 750–825° C. with a throughput of 100 gms./hr. The temperature was determined by a thermocouple inserted in the tube. An ordinary water-cooled condenser was used at the exit of the pyrolysis tube, and the pyrolysate passed through it and was collected.

Distillation of the pyrolysate, so obtained, through a 3 ft. spiral tantalum column gave a constant boiling fraction, 260 gms., boiling point 60° C./0.5 mm. Hg, to produce two components as determined by VPC (vapor-phase chromatography). The two components of this fraction were separated by fractional distillation using a Piros-Glover spinning band column; their purity was established by VPC analysis.

*Component 1.*—[6-methyl-2-vinyl 5-heptene-1-ol] had the following properties: boiling point 69.5–70.5 C./4 mm. Hg; $n_D^{20}$ 1.4666, $[\alpha]^{24}D$ +8.30°. Pertinent infrared data:

$$v_{max.}^{liq.}\ 3320\ cm.^{-1}\ (hydroxyl)$$

995 cm.$^{-1}$ and 911 cm.$^{-1}$ (vinyl methylene); 836 cm.$^{-1}$ (isopropylidene) as shown in FIGURE 1 described below.

This component weighed 90 gms., giving a yield of 22.5% of [6-methyl-2-vinyl 5-heptene-1-ol].

*Component 2.*—[2-(2-methyl propenyl)-5-hexene-1-ol] had the following properties: boiling point 66° C./4 mm. Hg, $n_D^{20}$ 1.4654, $[\alpha]^{24}D$ +13.34°. Pertinent infrared data:

$$v_{max.}^{liq.}\ 3320\ cm.^{-1}\ (hydroxyl)$$

995 cm.$^{-1}$ and 911 cm.$^{-1}$ (vinyl methylene); 848 cm.$^{-1}$ (isopropylidene), as shown in FIGURE 2 described below. It appears that the methyl alpha to the isopropylidene is responsible for displacements to higher frequencies than normally observed for the isopropylidene residue.

This component weighed 144 gms., giving a yield of 36% of [2-(2-methyl propenyl)-5-hexene-1-ol].

The residue consists of unreacted myrtanol.

The mixture of components 1 and 2 has a sweet, soft floral odor like the linalool family, but more earthy green. It is useful in hyacinth and violet-narcisse perfume compositions.

*Example 2.*—Trans-myrtanol, when pyrolyzed under similar conditions, gave an overall conversion of 55% of the aforementioned components. This conversion, however, produced more of component 1, 30%, than of component 2, 25%.

In general, the yields of the desired alcohols increase with increasing temperature, and the conversoin is greatest at 775–825° C.; incipient formation of components 1 and 2 occurs at 450° C. The recovered, unreacted myrtanol which is easily separated from the products by distillation may be recycled; since dehydration of myrtanol is negligible under the conditions described the conversion can be increased to 90% by recycling. Alternatively, increasing the residence time in the pyrolysis tube by increasing tube length also increases the conversion.

In the accompanying drawing forming part of this application:

I claim:
1. An acyclic alcohol selected from the group consisting of compounds having the following formulae:

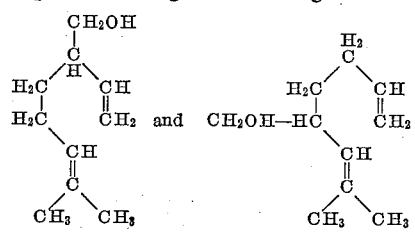

Figure 1:
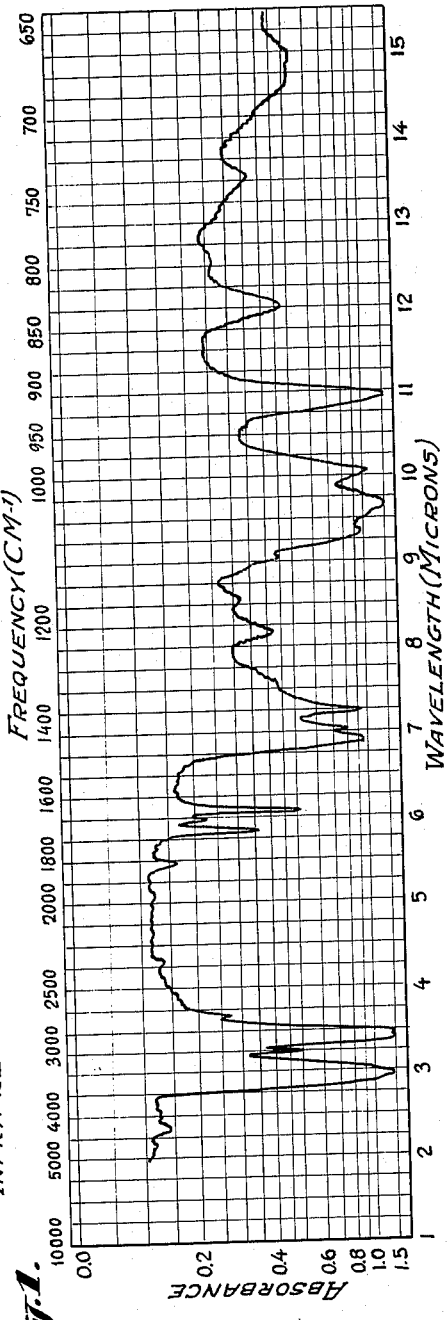
FIGURE 1 is an infrared spectrum of 6-methyl-2-vinyl 5-heptene-1-ol.

2. [6-methyl-2-vinyl 5-heptene-1-ol] having the following properties: boiling point 69.5–70.5° C./4 mm. Hg; $n_D^{20}$ 1.4666, $[\alpha]^{24}D$ +8.30°, and having the infrared spectrum shown in FIGURE 1.

Figure 2:
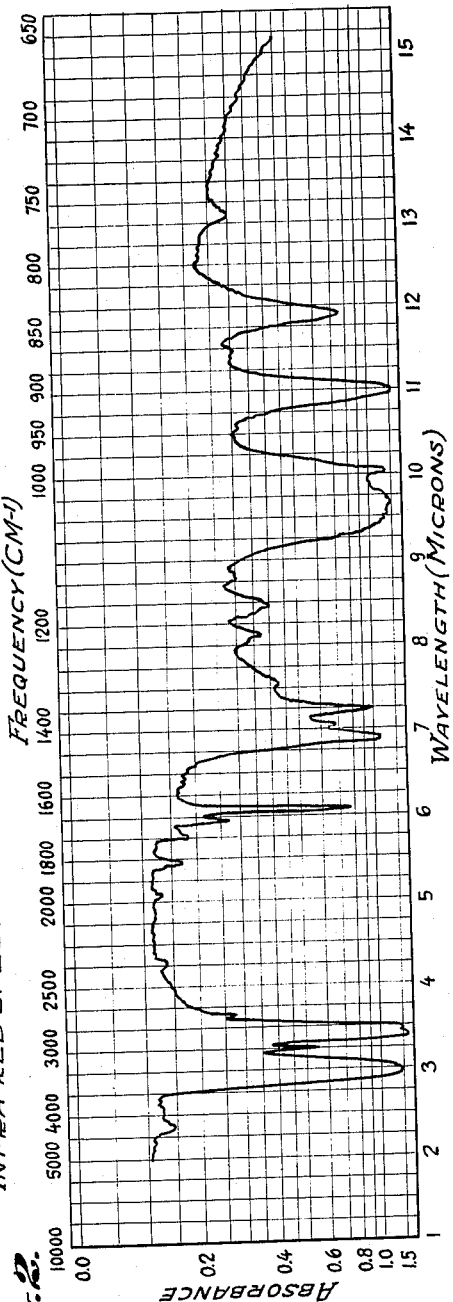
FIGURE 2 is an infrared spectrum of 2-(2-methyl-propenyl)-5-hexene-1-ol.

3. [2-(2-methyl-1-propen-1-yl)-5-hexene-1-ol] having the following properties: boiling point 66° C./4 mm. Hg, $n_D^{20}$ 1.4654, $[\alpha]^{24}D$ +13.34°, and having the infrared spectrum shown in FIGURE 2.

References Cited by the Examiner

UNITED STATES PATENTS

| | | | |
|---|---|---|---|
| 2,453,110 | 11/1948 | Bain et al. | 260—632 |
| 2,801,266 | 7/1957 | Schinz | 260—631.5 |
| 2,972,632 | 2/1961 | Bain et al. | 260—631.5 |
| 2,972,633 | 2/1961 | Klein | 260—631.5 |

FOREIGN PATENTS 1,150,974  7/1963  Germany.

OTHER REFERENCES

Bietstein: vol. 1, 3rd Sup. (1958), page 2014.
Heusler et al.: Chemistry of Terpenes, page 383 (1902).
Schinz: Chem. Abst., vol. 41 (1947), page 1392.

LEON ZITVER, *Primary Examiner.*

CHARLES B. PARKER, *Examiner.*

A. H. SUTTO, M. B. ROBERTO, J. E. EVANS,
*Assistant Examiners.*